(12) United States Patent
Li et al.

(10) Patent No.: US 10,129,458 B2
(45) Date of Patent: Nov. 13, 2018

(54) METHOD AND SYSTEM FOR DYNAMICALLY ADJUSTING PARAMETERS OF CAMERA SETTINGS FOR IMAGE ENHANCEMENT

(71) Applicant: Automotive Research & Testing Center, Changhua Hsien (TW)

(72) Inventors: Chuan-Ren Li, Changhua Hsien (TW); Li-You Syu, Changhua Hsien (TW); Yun-Ling Chang, Changhua Hsien (TW)

(73) Assignee: Automotive Research & Testing Center, Changhua Hsien (TW)

( * ) Notice: Subject to any disclaimer, the term of this patent is extended or adjusted under 35 U.S.C. 154(b) by 92 days.

(21) Appl. No.: 15/394,256

(22) Filed: Dec. 29, 2016

(65) Prior Publication Data

US 2018/0191949 A1    Jul. 5, 2018

(51) Int. Cl.
*H04N 7/18*     (2006.01)
*H04N 5/232*    (2006.01)
(Continued)

(52) U.S. Cl.
CPC ....... *H04N 5/23216* (2013.01); *G06K 9/4604* (2013.01); *G06K 9/4642* (2013.01); *G06K 9/6202* (2013.01); *G06T 5/003* (2013.01); *H04N 5/23293* (2013.01); *H04N 7/183* (2013.01); *G06K 9/00791* (2013.01); *G06T 2207/10004* (2013.01); *G06T 2207/20021* (2013.01);
(Continued)

(58) Field of Classification Search
CPC .......... G01S 3/7864; G06K 2009/3291; G06T 2207/30241; G06T 7/246; H04N 3/155; H04N 5/33; H04N 5/3454; H04N 5/374
See application file for complete search history.

(56) References Cited

U.S. PATENT DOCUMENTS

| 2008/0292207 A1* | 11/2008 | Kang | G06T 5/008 |
| | | | 382/274 |
| 2009/0051817 A1* | 2/2009 | Chen | H04N 1/58 |
| | | | 348/625 |

(Continued)

FOREIGN PATENT DOCUMENTS

| CN | 105684417 A | | 6/2016 |
| EP | 3065392 | * | 9/2016 |
| EP | 3065392 A1 | | 9/2016 |

*Primary Examiner* — Jessica M Prince
(74) *Attorney, Agent, or Firm* — C. G. Mersereau; Nikolai & Mersereau, P.A.

(57) ABSTRACT

A method for image-based dynamic feature enhancement includes: using the camera to capture multiple images, selecting an ROI from each of the multiple images displayed on the camera through the ROI selection unit, configuring multiple brightness weights to correspond to the ROI, adjusting brightness of the image according to the multiple brightness weights and multiple actual brightness values corresponding to the ROI, and performing a multi-layer progressive sharpening process to adjust multiple actual sharpening parameters of the image through the sharpening adjustment unit. The camera parameters of the camera can be directly and instantly adjusted to improve brightness and sharpening of images captured by the camera and facilitate advanced driver assistance system to clearly identify road conditions.

5 Claims, 7 Drawing Sheets

(51) Int. Cl.
*G06K 9/46* (2006.01)
*G06T 5/00* (2006.01)
*G06K 9/62* (2006.01)
*G06K 9/00* (2006.01)

(52) U.S. Cl.
CPC ............... *G06T 2207/20192* (2013.01); *G06T 2207/30252* (2013.01)

(56) References Cited

U.S. PATENT DOCUMENTS

| | | | |
|---|---|---|---|
| 2014/0241585 A1* | 8/2014 | Zafiroglu | G06K 9/00 382/104 |
| 2017/0091909 A1* | 3/2017 | Cao | G06T 5/002 |
| 2017/0112382 A1* | 4/2017 | Nakata | A61B 5/00 |

\* cited by examiner

METHOD AND SYSTEM FOR DYNAMICALLY ADJUSTING PARAMETERS OF CAMERA SETTINGS FOR IMAGE ENHANCEMENT

BACKGROUND OF THE INVENTION

1. Field of the Invention

The present invention relates to a method and a system for enhancing features of dynamic image and, more particularly, to a method and a system for dynamically adjusting parameters of camera settings for image enhancement, which can directly adjust camera parameters of a camera taking the dynamic image.

2. Description of the Related Art

Intelligent image processing has been applied to many aspects of human life to bring forth safety and convenience in living attributable to widespread digital cameras in everyday life of people and computer vision development. For example, applications for safety surveillance include face recognition, fingerprint recognition, smoke detection and the like. As for car electronics, intelligent advanced driver assistance systems (ADAS) have rapidly grown in the automotive market in an attempt to reduce traffic accident rate using artificial intelligence and include lane departure warning system, parking assistance system, forward collision warning system and the like pertaining to techniques into which car manufacturers put a lot effort.

Figure 6:
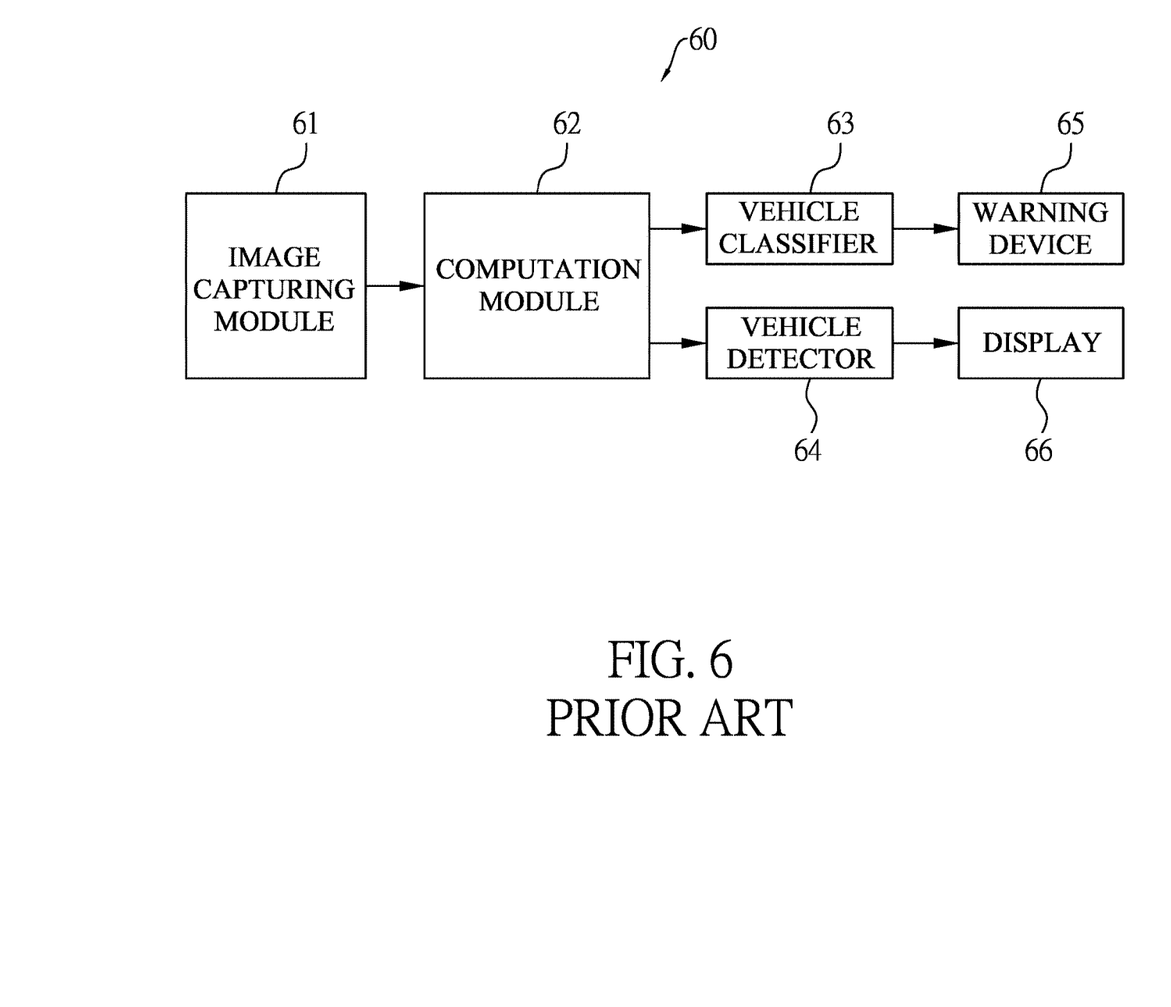
FIG. 6 is a functional block diagram of a conventional advanced driver assistance system.

With reference to FIG. 6, a conventional ADAS 60 includes an image capturing module 61, a computation module 62, a vehicle classifier 3, a vehicle detector 64, a warning device 65 and a display 66. The image capturing module 61 acquires road ahead images. The computation module 62 is connected to the image capturing module 61 and performs analysis and recognition on the acquired images. The vehicle classifier 63 is connected to the computation module 62 to classify types of vehicles shown in the images, facilitating determination of degree of severity in the event of collision. The vehicle detector 64 is connected to the computation module 62 to detect vehicles ahead and coming from the opposite direction. The warning device 65 is connected to the vehicle classifier 63 and the vehicle detector 64, and sends out an alert when detecting irregular surrounding conditions, such as vehicle coming from an opposite direction, vehicle ahead in a close range, truck ahead and the like. The display 66 is connected to the vehicle detector 64 to receive the images to show the road conditions.

For applications of the ADAS, image processing appears to be the core technique because correct recognition rate depends on image quality. However, the image capturing module 61 is operated at all times with fixed camera parameters, such as white balance, brightness, colors and the like, which fail to be adaptive to all kinds of environment, such as backlight environment, and environments with low light level and regular light level). The consequence that the captured images are overexposed or have a low brightness may lead to car accident arising from the failure of the ADAS in effectively determining the threat and risk coming from vehicles or obstacles in the images.

As disclosed in a Chinese Patent No. CN105684417A (hereinafter called conventional technique) entitled "Image processing device, image capture device, parameter generating method, image processing method, and program", a method for adjusting restoration intensity and sharpening intensity carries out a sharpening process of a sharpening filter on image data through a contour enhancement processing unit. The image data restoration degree that is adjusted according to variation of the image data sharpening degree can be used to compensate effect caused by the variation of the sharpening intensity and further stably improve image quality of the image data. The conventional technique emphasizes on contour enhancement processing of output images while ignores improvement on brightness of the images.

SUMMARY OF THE INVENTION

An objective of the present invention is to provide a method and a system for dynamically adjusting parameters of camera settings for image enhancement targeting at adjustment of camera parameters of a camera under environments with different lighting conditions and facilitating ADAS to clearly identify road conditions.

To achieve the foregoing objective, the method for dynamically adjusting parameters of camera settings for image enhancement performed by a system for dynamically adjusting parameters of camera settings for image enhancement, wherein the system includes a camera, a region of interest (ROI) selection unit and a sharpening adjustment unit, the method comprising:

using the camera to capture multiple images;
selecting an ROI from each of the multiple images displayed on the camera through the ROI selection unit;
configuring multiple brightness weights to correspond to the ROI;
performing a contour analysis of each image; and
performing a multi-layer progressive sharpening process to adjust multiple actual sharpening parameters of the image through the sharpening adjustment unit.

To achieve the foregoing objective, the system for dynamically adjusting parameters of camera settings for image enhancement includes a camera, a display screen, a region of interest (ROI) selection unit, a block division unit, an image analysis unit, a brightness weight configuration unit, a brightness adjustment unit and a sharpening adjustment unit.

The camera has a memory.

The display screen is connected to the camera.

The ROI selection unit is electrically connected to the display screen and defines a range of a ROI on each image taken by the camera and displayed on the display screen.

The block division unit is electrically connected to the display screen and divides the image on the display screen into multiple blocks.

The image analysis unit is electrically connected to the camera and analyzes multiple actual brightness values and multiple actual sharpening parameters of multiple images taken by the camera.

The brightness weight configuration unit is electrically connected to the image analysis unit and the display screen, receives the actual brightness values corresponding to the blocks of each image, and configures a brightness weight of a sub-image on each block of the image by mapping the actual brightness value corresponding to the block to a brightness weight in a brightness weight mapping table stored in the memory of the camera.

The brightness adjustment unit is electrically connected to the brightness weight configuration unit and the camera and adjusts the actual brightness values of the sub-images on the multiple blocks of the image according to the brightness weight configured in each block.

The sharpening adjustment unit is electrically connected to the camera and the image analysis unit, and adjusts the actual sharpening parameter corresponding to the sub-image on each block of each image according to degree of distortion of the sub-image.

The advantages of the present invention resides in direct and instant adjustment of the camera parameters of the camera that improves brightness and sharpening of images captured by the camera required by ADAS to clearly identify road conditions.

Other objectives, advantages and novel features of the invention will become more apparent from the following detailed description when taken in conjunction with the accompanying drawings.

DETAILED DESCRIPTION OF THE INVENTION

Figure 1:
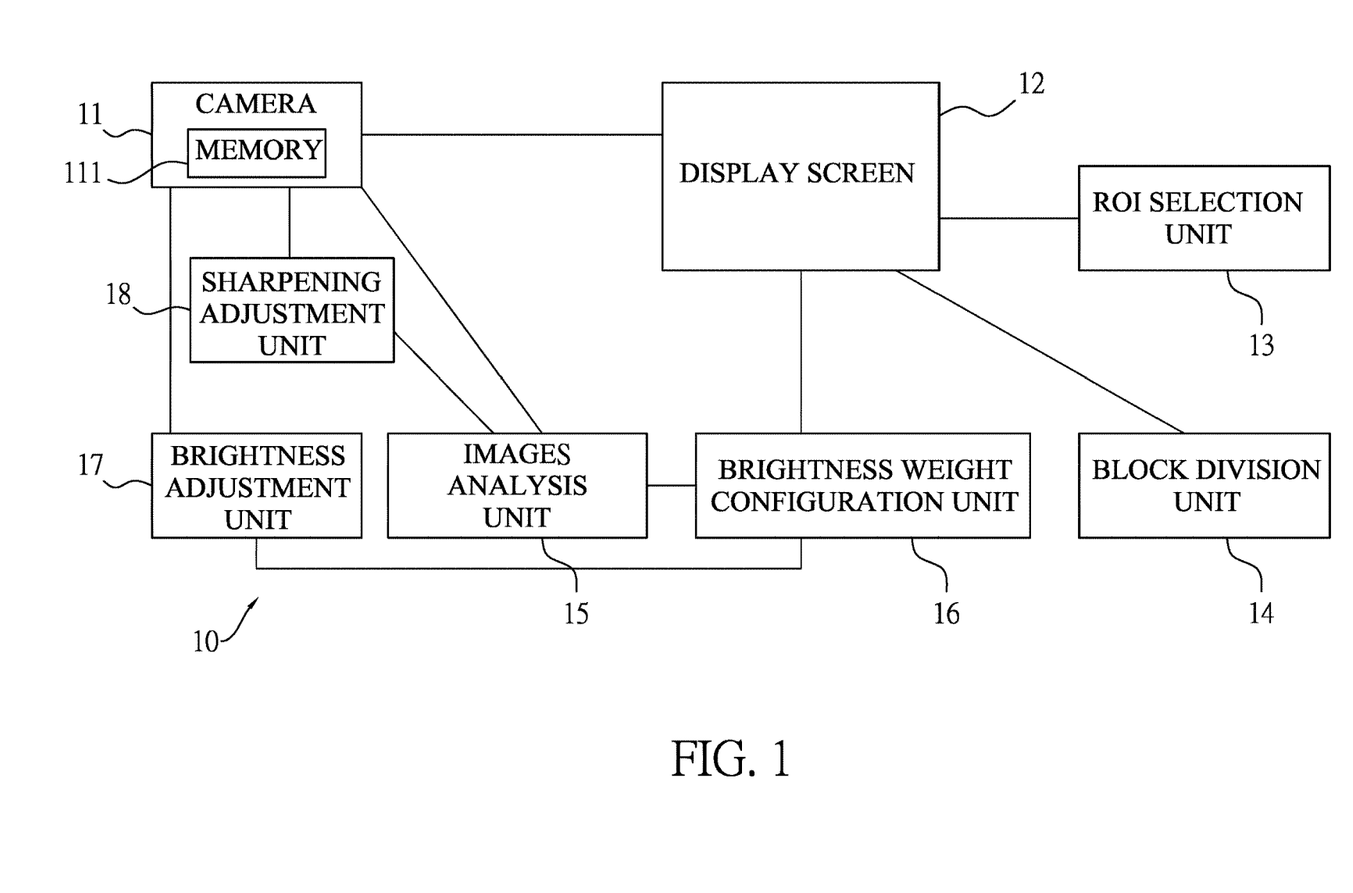
FIG. 1 is a functional block diagram of a system for dynamically adjusting parameters of camera settings for image enhancement in accordance with the present invention.
Figure 2A:
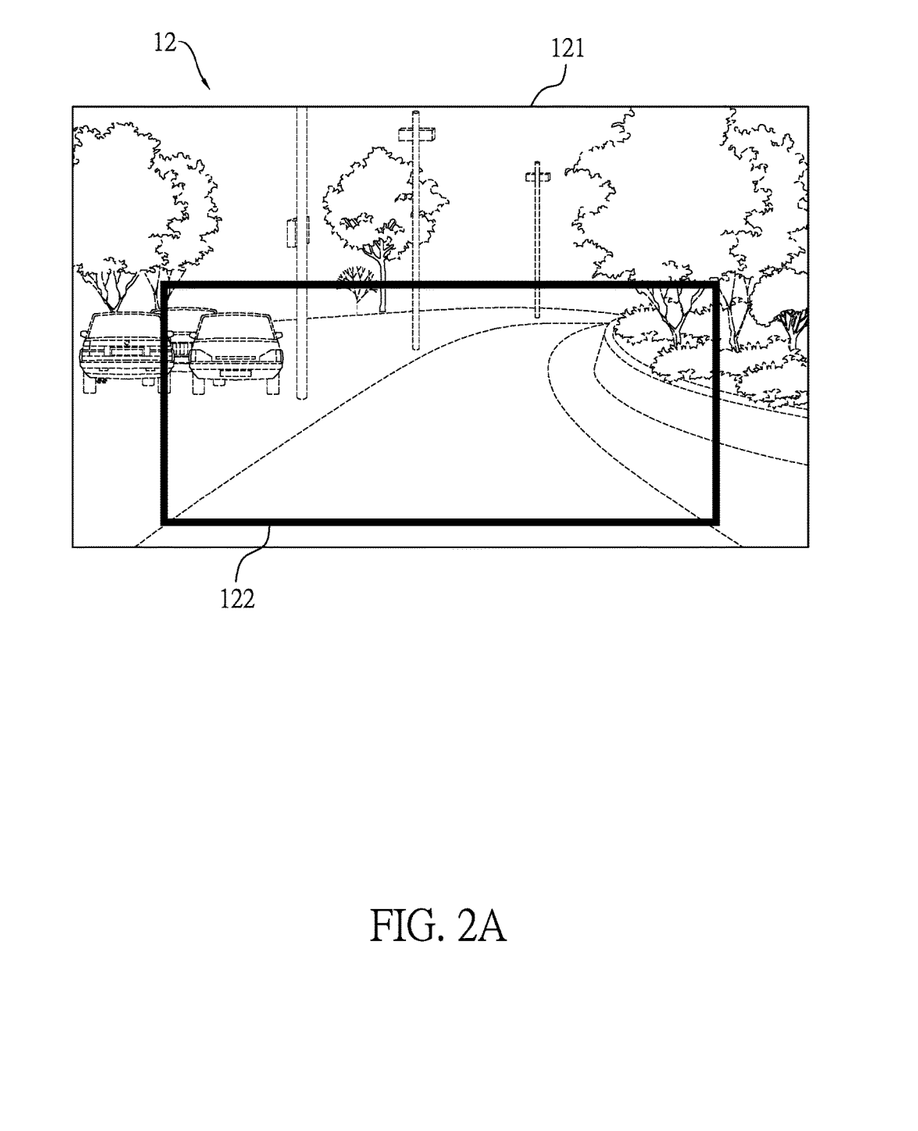
FIG. 2A is a schematic diagram showing an ROI selected by a method for dynamically adjusting parameters of camera settings for image enhancement in accordance with the present invention.
Figure 2B:
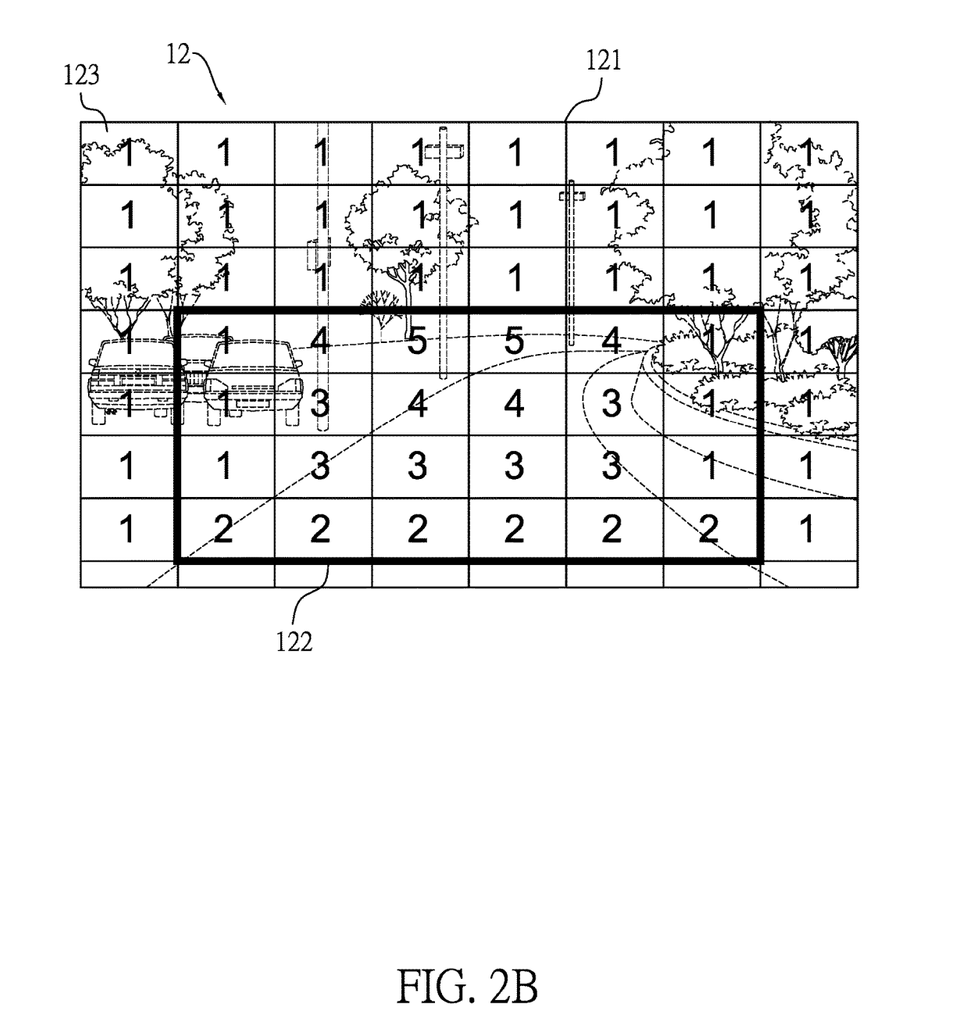
FIG. 2B is a schematic diagram showing a weight distribution applied by a method for dynamically adjusting parameters of camera settings for image enhancement in accordance with the present invention.

With reference to FIGS. 1, 2A and 2B, a system for dynamically adjusting parameters of camera settings for image enhancement 10 in accordance with the present invention includes a camera 11, a display screen 12, a region of interest (ROI) selection unit 13, a block division unit 14, an image analysis unit 15, a brightness weight configuration unit 16, a brightness adjustment unit 17 and a sharpening adjustment unit 18.

The camera 11 may be a regular digital camera or a regular digital video camcorder and includes the display screen 12 or is externally connected to the display screen 12. The camera 11 has a memory 111 storing multiple images 121 taken by the camera 11. The ROI selection unit 13 is electrically connected to the display screen 12 and defines the range of an ROI 122 of each image 121 displayed on the display screen 12 based on different road conditions, time and weather.

The block division unit 14 is electrically connected to the display screen 12 and serves to divide the image 121 on the display screen 12 into multiple blocks 123. The image analysis unit 15 is electrically connected to the camera 11 and serves to analyze multiple actual brightness values and multiple actual sharpening parameters of multiple images taken by the camera 11. The brightness weight configuration unit 16 is electrically connected to the image analysis unit 15 and the display screen 12, receives the actual brightness values corresponding to the blocks of each image 121, and configures a brightness weight of a sub-image on each block 123 by mapping the actual brightness value corresponding to the block 123 to a brightness weight in a brightness weight mapping table stored in the memory 111 of the camera 11. The brightness weight mapping table in the camera 11 includes multiple actual brightness values and multiple brightness weights corresponding to the multiple actual brightness values and varies from manufacturer to manufacturer. Given the brightness weight mapping table, the system for dynamically adjusting parameters of camera settings for image enhancement 10 can adjust the image 121 on the display screen 12 in a bright and clear fashion according to a brightness range represented by the brightness weight configured in each block 123. How to create the brightness weight mapping table is well-known to persons skilled in the art and is therefore not elaborated here. The brightness adjustment unit 17 is electrically connected to the brightness weight configuration unit 16 and the camera 11 and adjusts the actual brightness values of the sub-images on the multiple blocks 123 of the image 121 according to the brightness weight configured in each block 123.

The sharpening adjustment unit 18 is electrically connected to the camera 11 and the image analysis unit 15, and utilizes a multi-layer progressive sharpening process to enhance contour clarity of the multiple image taken by the camera 11 according to the actual sharpening parameters of the multiple images analyzed by the image analysis unit 15, adjust the actual sharpening parameter corresponding to the sub-image on each block 123 of each image 121 depending on degree of distortion of the sub-image, boost high-frequency edge information of the sub-image as a layer of boosted edge information, and combine the multiple layers of boosted edge information of the sub-images of each image after brightness of the sub-image in each block 123 of the image is adjusted, thereby attaining the purpose of contour enhancement for the multiple images.

Figure 3:
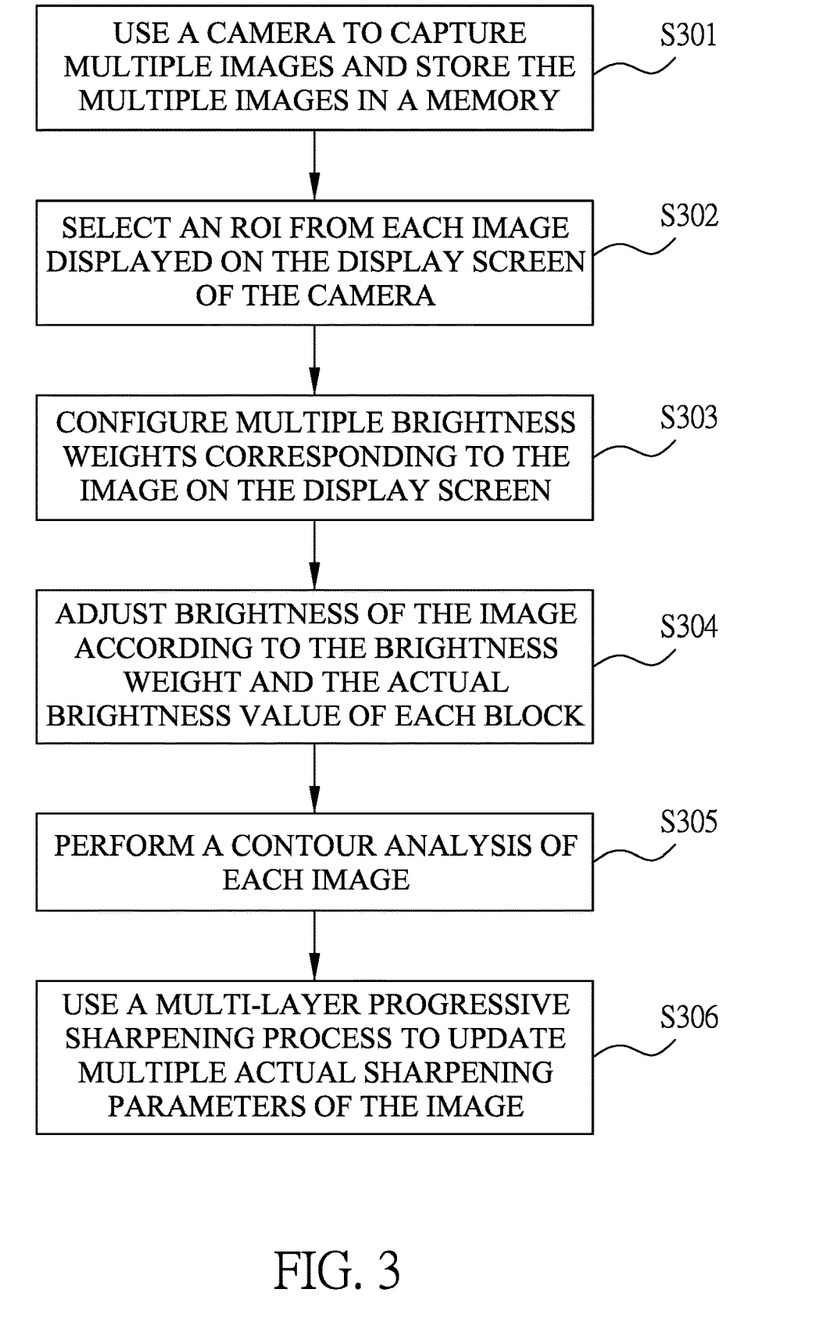
FIG. 3 is a flow diagram of a method for dynamically adjusting parameters of camera settings for image enhancement in accordance with the present invention.

With reference to FIGS. 1 and 3, a method for dynamically adjusting parameters of camera settings for image enhancement in accordance with the present invention includes the following steps.

Step S301: Use a camera 11 to capture multiple images and store the multiple images in a memory 111. The camera 11 of the system for dynamically adjusting parameters of camera settings for image enhancement continuously takes multiple road ahead images. As the environmental brightness and contours of objects on the images won't suddenly change, image processing is performed on the multiple images taken in a previous time duration, and the camera parameters of the camera 11 are adjusted for the multiple images taken in the current time duration to be displayed on the display screen 12 in a vivid and clear way.

Step S302: Select an ROI 122 from each image 121 displayed on the display screen 12 of the camera 11. It is noted that not all the blocks of the image 121 on the display screen 12 require image enhancement processing. Instead, choosing the ROI 122 can lower time for image computation and accelerate time for image enhancement. For example, with reference to FIG. 2A, a bordering area outside the ROI 122 has trees or stationary vehicles displayed thereon. As not on a vehicle-moving path, those objects on the bordering area are not a portion interested for image enhancement processing. Accordingly, selection of the ROI 122 narrows down a range for image processing and reduces the load and time required by the system for dynamically adjusting parameters of camera settings for image enhancement to perform image processing.

The system for dynamically adjusting parameters of camera settings for image enhancement 10 may be integrated in an electronic system of a vehicle, such as a navigation system or a central control system, or the system for dynamically adjusting parameters of camera settings for image enhancement 10 may be installed in an automated driving system. The range of the ROI 122 varies with environments, such that users can adjust the range of the ROI to adapt to different road conditions and driver's perspectives.

Step S303: Configure multiple brightness weights corresponding to the image 121 on the display screen 12. After selecting the ROI 122, the method for dynamically adjusting parameters of camera settings for image enhancement divides the image 121 and the ROI 122 into multiple blocks 123 respectively and labels the multiple brightness weights on the respective blocks 123. Not the sub-images on all the blocks 123 are overexposed or insufficiently luminous. Some of the blocks 123 are excessively bright (overexposed) while some other blocks 123 are excessively dark (underexposed). Hence, a block-by-block brightness adjustment needs to be performed. Configuration of the multiple brightness weights for the blocks 123 can be implemented by first creating a brightness weight mapping table and assigning a brightness weight in the brightness weight mapping table, which is mapped by an actual brightness value of the sub-image on each block 123, to the block 123. The brightness weight mapping table may be stored in the brightness weight configuration unit 16 or in the memory 111 of the camera 11. The brightness weight mapping table may be user-dependent, vehicle-dependent or camera-dependent.

Given as an example as shown in FIG. 2B, as the area outside the ROI 122 is not the focus for image enhancement, the brightness weights over the area are all set to be 1, indicating that the actual brightness values corresponding to the area are remained the same, while each block 123 inside the ROI 122 is given a different brightness weight, such as 5 indicative of an excessively dark (underexposed) block 123 and 2 indicative of an overexposed block 123.

Step S304: Adjust brightness of the image 121 according to the brightness weight and the actual brightness value of each block 123. The actual brightness values of the image 121 on the display screen 12 are adjusted according to the brightness weight of each block 123. In the case of an underexposed block, the actual brightness value corresponding to the block is increased. In the case of an overexposed block, the actual brightness value corresponding to the block is decreased. The method for dynamically adjusting parameters of camera settings for image enhancement adjusts brightness using the multiple images captured by the camera 11 and directly performs adjustment of the brightness parameters of the camera 11 instead of image processing on the multiple images.

Step S305: Perform a contour analysis of each image 121. After brightness of the image 121 of the camera 11 is completed, sharpening enhancement of the image 121 can be performed. However, prior to the sharpening adjustment, a contour analysis of each image 121 needs to be conducted to determine if edges of objects on the multiple images 121 captured by the camera 11 are blurred or clear.

Step S306: Use a multi-layer progressive sharpening process to update multiple actual sharpening parameters of the image 121. The sharpening adjustment of the image 121, which uses a fine-tuning approach to progressively adjust the sharpening parameter in a step-by-step manner for the sharpening parameter of the camera 11 to be adjusted to be within a tolerance range of a threshold, is performed by the system for dynamically adjusting parameters of camera settings for image enhancement.

Figure 4:
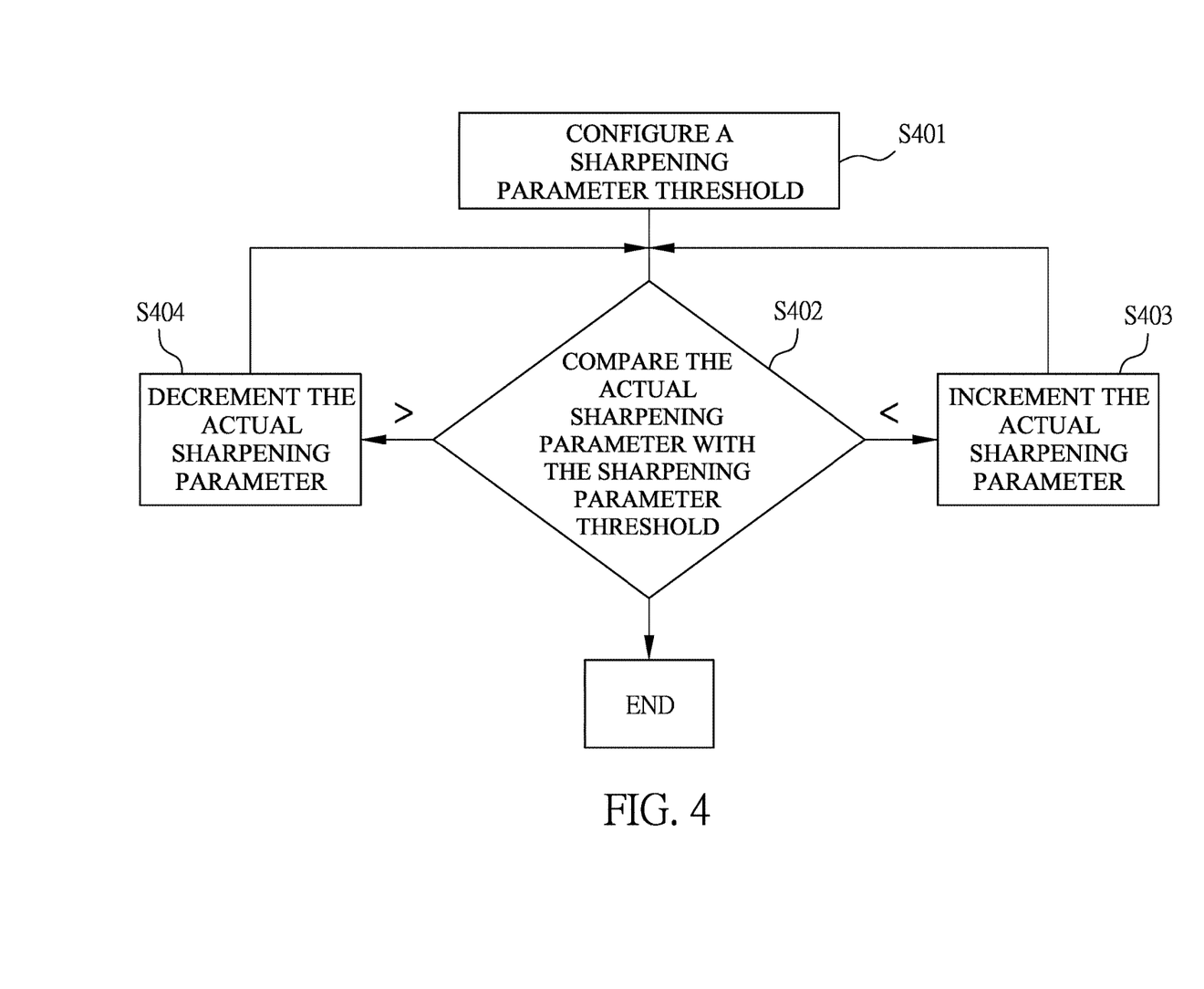
FIG. 4 is a flow diagram of a multi-layer progressive sharpening process of the method in FIG. 3.

With reference to FIG. 4, the multi-layer progressive sharpening process includes the following steps.

Step S401: Configure a sharpening parameter threshold. The configured sharpening parameter threshold is stored in the memory 111 of the camera 11. In the image 121 displayed on the camera 11, the sub-images on the multiple blocks 123 in the ROI 121 of the image 121 have different actual sharpening parameters. The actual sharpening parameters of the sub-images on the multiple blocks 123 are adjusted according to the sharpening parameter threshold for the images 121 taken by the camera 11 to have visible and clear contours.

Step S402: Compare the actual sharpening parameter with the sharpening parameter threshold. The actual sharpening parameter is progressively increased or decreased to approach the sharpening parameter threshold, which is a configured value as a basis of having clear and visible contours of objects on the images. The sharpening parameter threshold can be modified on user's demand. Upon adjustment of the sharpening parameter threshold, a tolerance range of the sharpening parameter threshold can be configured, such that the actual sharpening parameters of the image 121 can be progressively adjusted to fall within the tolerance range of the sharpening parameter threshold for the images taken by the camera 11 to be clear and visible. If the actual sharpening parameter is less than the tolerance range of the sharpening parameter threshold, perform step S403 and resume step S402, if the actual sharpening parameter is greater than the tolerance range of the sharpening parameter threshold, perform step S404 and resume step S402, and if the actual sharpening parameter falls within the tolerance range of the sharpening parameter threshold, terminate the multi-layer progressive sharpening process.

Step S403: Increment the actual sharpening parameter.

Step S404: Decrement the actual sharpening parameter.

The value to be incremented or decremented each time from the actual sharpening parameter of each block 123 on the image 121 can be configured in the multi-layer progressive sharpening process. For example, with reference to FIG. 5, one example shows that the multi-layer progressive sharpening process configures multiple sharpening processing layers, such as four sharpening processing layers including a first progressively incrementing sharpening layer 41, a second progressively incrementing sharpening layer 42, a first progressively decrementing sharpening layer 51 and a second progressively decrementing sharpening layer 52. The four sharpening processing layers indicate that whenever the multi-layer progressive sharpening process is performed, the actual sharpening parameter is progressively incremented or decremented twice. Different number of sharpening processing layers can be configured based on user's demand. The more the number of the sharpening processing layers is, the faster and more accurate the actual sharpening parameter can be adjusted to the sharpening parameter threshold.

Figure 5:
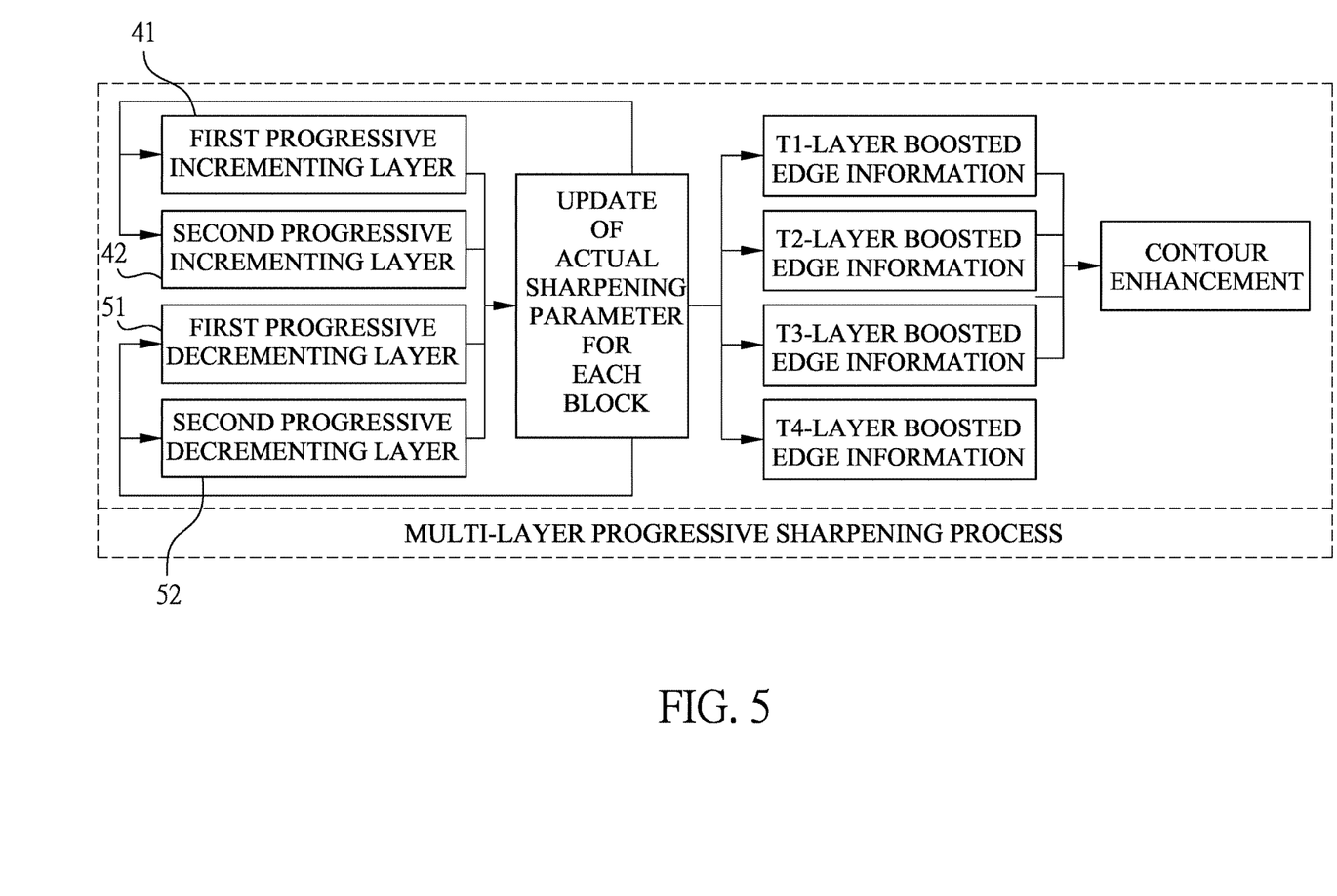
FIG. 5 is an operational functional diagram of the multi-layer progressive sharpening process in FIG. 4.

Given an example for explanation, in consideration of the contour clarity of the multiple images, a value range of the actual sharpening parameter can be configured to be 0~255, indicative of 256 levels. Suppose that the value of the actual sharpening parameter of a certain block on the image 121 is 200, the tolerance range of the sharpening parameter threshold is 231±5, and there are two sharpening processing layers, namely, the first progressively incrementing sharpening layer 41 and the first progressively decrementing sharpening layer 51. To adjust the actual sharpening parameter to fall within the tolerance of the sharpening parameter threshold, which is 226~236, the multi-layer progressive sharpening process enters the first progressively incrementing sharpening layer 41, and the first progressively incrementing sharpening layer 41 increases the actual sharpening parameter by 5 and is thus adjusted to 205. As the value of the actual sharpening parameter is still less than the lower bound of the tolerance range of the sharpening parameter threshold, the multi-layer progressive sharpening process enters the first progressively incrementing sharpening layer 41 again to increase the actual sharpening parameter until the actual sharpening parameter falls within the tolerance range of the sharpening parameter threshold. On the other hand, if the actual sharpening parameter is greater than the upper bound of the tolerance range of the sharpening parameter threshold, the multi-layer progressive sharpening process enters the first progressively decrementing sharpening layer 51 to progressively decrement the actual sharpening parameter until the actual sharpening parameter falls within the tolerance range of the sharpening parameter threshold.

Moreover, in step S306 degree of edge exposure associated with the sub-images of the picture 121 are graded to enhance the object contours in the sub-images on the multiple blocks 123. The multi-layer progressive sharpening process is employed to identify corresponding edges in the sub-images on the blocks 123, fix the actual sharpening parameters of the sub-images according to the degree of distortion associated with the sub-images on the blocks, then boost high-frequency edge information of the sub-images to form multiple layers of boosted edge information, such as the T1-layer of edge information, T2-layer of edge information, T3-layer of edge information, and T4-layer of edge information as shown in FIG. 5, and combines the multiple layers of boosted edge information for the purpose of contour enhancement of the sub-images displayed on the blocks 123. The camera parameters of the camera 11 are progressively adjusted by using the multiple images captured by the camera 11 in a previous duration to improve the way of adjusting quality of current images outputted from the camera 11. As involving direct adjustment of camera parameters, such as brightness parameters and sharpening parameters, for image enhancement, the method and system for dynamically adjusting parameters of camera settings for image enhancement allow the ADAD to have instant control over road conditions and make decision in the first place according to the image enhancement on multiple images captured by the camera 11.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A method for dynamically adjusting parameters of camera settings for image enhancement performed by a system for image-based dynamic feature enhancement, wherein the system includes a camera, a region of interest (ROI) selection unit and a sharpening adjustment unit, the method comprising:
using the camera to capture multiple images;
selecting an ROI from each of the multiple images displayed on the camera through the ROI selection unit;
dividing the ROI into multiple blocks and configuring multiple brightness weights to the respective blocks of the ROI;
performing a contour analysis of each image; and
performing a multi-layer progressive sharpening process to adjust multiple actual sharpening parameters corresponding to the respective blocks of the ROI of the image through the sharpening adjustment unit, wherein the multi-layer progressive sharpening process comprises:
configuring a sharpening parameter threshold;
comparing the actual sharpening parameter corresponding to each block of the ROI with the sharpening parameter threshold and progressively incrementing or decrementing the actual sharpening parameter for the actual sharpening parameter to fall within a tolerance range of the sharpening parameter threshold; and
grading degree of edge exposure associated with sub-images on the blocks of the ROI to enhance object contours in the sub-images.

2. The method as claimed in claim 1, wherein the brightness weights are configured by mapping an actual brightness value corresponding to each block of the ROI to one of the multiple brightness weights in a brightness weight mapping table, and the actual brightness value of the block is adjusted according to the mapped brightness weight.

3. The method as claimed in claim 1, wherein the multiple images and the sharpening parameter threshold are stored in a memory.

4. A system for dynamically adjusting parameters of camera settings for image enhancement, comprising:
a camera capturing multiple images and having a memory;
a display screen connected to the camera;
a region of interest (ROI) selection unit electrically connected to the display screen and defining a range of an ROI on each image taken by the camera and displayed on the display screen;
a block division unit electrically connected to the display screen and dividing the image on the display screen into multiple blocks;
an image analysis unit electrically connected to the camera and analyzing multiple actual brightness values and multiple actual sharpening parameters corresponding to the respective blocks of the image;
a brightness weight configuration unit electrically connected to the image analysis unit and the display screen, receiving the actual brightness values corresponding to the respective blocks of the image, and configuring a brightness weight of a sub-image on each block of the image by mapping the actual brightness value corresponding to the block to a brightness weight in a brightness weight mapping table stored in the memory of the camera;
a brightness adjustment unit electrically connected to the brightness weight configuration unit and the camera and adjusting the actual brightness values of the sub-images on the multiple blocks of the image according to the brightness weight configured in each block; and
a sharpening adjustment unit electrically connected to the camera and the image analysis unit, performing a multi-layer progressive sharpening process to enhance contours of objects in the sub-image of each block of the image, and adjusting the actual sharpening parameter corresponding to the sub-image on each block of each image according to degree of distortion of the sub-image, wherein the multi-layer progressive sharpening process progressively increments or decrements the actual sharpening parameter corresponding to each block of each image according to a comparison between the actual sharpening parameter and a sharpening parameter threshold until the actual sharpening parameter falls within a tolerance range of the sharpening parameter threshold.

5. The system as claimed in claim 4, wherein the multiple images and the sharpening parameter threshold are stored in the memory of the camera.

\* \* \* \* \*